(12) United States Patent
Sung et al.

(10) Patent No.: US 10,697,508 B2
(45) Date of Patent: Jun. 30, 2020

(54) BRAKE DISC AND BRAKE DISC MANUFACTURING METHOD

(71) Applicant: KOREA AUTOMOTIVE TECHNOLOGY INSTITUTE, Chungcheongnam-do (KR)

(72) Inventors: Si Young Sung, Chungcheongnam-do (KR); Beom Suck Han, Gyeonggi-do (KR); Se Hoon Kim, Chungcheongnam-do (KR); Jae Hyuk Shin, Chungcheongnam-do (KR); Jin Pyeong Kim, Chungcheongnam-do (KR)

(73) Assignee: KOREA AUTOMOTIVE TECHNOLOGY INSTITUTE, Chungcheongnam-Do (KR)

( * ) Notice: Subject to any disclaimer, the term of this patent is extended or adjusted under 35 U.S.C. 154(b) by 32 days.

(21) Appl. No.: 16/091,622

(22) PCT Filed: Apr. 3, 2017

(86) PCT No.: PCT/KR2017/003634
§ 371 (c)(1),
(2) Date: Oct. 5, 2018

(87) PCT Pub. No.: WO2017/176016
PCT Pub. Date: Oct. 12, 2017

(65) Prior Publication Data
US 2019/0120309 A1    Apr. 25, 2019

(30) Foreign Application Priority Data
Apr. 5, 2016 (KR) .................. 10-2016-0041619

(51) Int. Cl.
*F16D 65/12* (2006.01)
*B22D 19/02* (2006.01)
(Continued)

(52) U.S. Cl.
CPC ............ *F16D 65/125* (2013.01); *B22D 17/00* (2013.01); *B22D 19/02* (2013.01); *B22D 19/04* (2013.01);
(Continued)

(58) Field of Classification Search
CPC ........ F16D 65/125; F16D 65/126; F16D 65/12; F16D 2065/132; F16D 2200/0013;
(Continued)

(56) References Cited

U.S. PATENT DOCUMENTS

2005/0217950 A1* 10/2005 Jolley, Jr. ............... F16D 65/10
188/218 R
2012/0186919 A1* 7/2012 Hanna ..................... F16D 65/12
188/218 XL
(Continued)

FOREIGN PATENT DOCUMENTS

DE    102009030428 A1    12/2010
DE    102011101432 A1    11/2012
(Continued)

*Primary Examiner* — Thomas J Williams
(74) *Attorney, Agent, or Firm* — Mayer & Williams, PC; Stuart H. Mayer

(57) ABSTRACT

Provided are a brake disc and a brake disc manufacturing method. The brake disc manufacturing method may include a porous metal block preparation operation for preparing a porous metal block having a plurality of pores therein, and an insert casting operation for mounting the porous metal block in a mold and casting a disc plate material to manufacture a brake disc.

5 Claims, 8 Drawing Sheets

(51) Int. Cl.
*B22D 17/02* (2006.01)
*B22D 19/04* (2006.01)
*B22D 29/00* (2006.01)
*B22D 17/00* (2006.01)
*B22D 25/00* (2006.01)
*C22C 37/10* (2006.01)
*F16D 65/02* (2006.01)

(52) U.S. Cl.
CPC ........... *B22D 25/005* (2013.01); *B22D 29/00* (2013.01); *B22D 29/005* (2013.01); *B22D 29/006* (2013.01); *F16D 65/12* (2013.01); *C22C 37/10* (2013.01); *F16D 2065/132* (2013.01); *F16D 2200/0013* (2013.01); *F16D 2250/0015* (2013.01)

(58) Field of Classification Search
CPC ..... F16D 2250/0007; F16D 2250/0015; B22D 17/00; B22D 17/02; B22D 19/02; B22D 19/0054; B22D 25/005; B22D 29/00

USPC .................................................. 188/218 XL
See application file for complete search history.

(56) References Cited

U.S. PATENT DOCUMENTS

| | | |
|---|---|---|
| 2013/0081776 A1 | 4/2013 | Hanna et al. |
| 2013/0081777 A1 | 4/2013 | Orsi |

FOREIGN PATENT DOCUMENTS

| | | |
|---|---|---|
| JP | 05044752 A * | 2/1993 |
| JP | 2009-166130 | 7/2009 |
| KR | 1020020093411 | 12/2002 |
| KR | 1020050034864 | 4/2005 |
| KR | 1020130013010 | 2/2013 |
| WO | 2010/131273 A1 | 5/2009 |
| WO | 2013/127896 A1 | 9/2013 |

* cited by examiner

BRAKE DISC AND BRAKE DISC MANUFACTURING METHOD

TECHNICAL FIELD

The present invention relates to a brake disc and a brake disc manufacturing method, and more particularly, to a brake disc and a brake disc manufacturing method used for a braking system of a vehicle.

BACKGROUND ART

In general, a vehicle brake is mainly divided into a disc brake and a drum brake. The disc brake generates a braking force based on friction created using calipers to squeeze pads against both sides of a disc that rotates together with a wheel. The drum brake obtains a braking force by squeezing brake shoes with linings (a friction material) into a drum that rotates together with a wheel.

Currently, since many technologies for achieving stability of a vehicle based on braking, e.g., anti-lock braking (ABS) and vehicle dynamic steering (VDS)/electronic stability program (ESP), have been developed, the drum brake which does not provide a sufficient braking force due to expansion when used repeatedly is not used and the disc brake is used for rear wheels as well as front wheels.

A conventional brake disc manufacturing method includes a method of manufacturing a brake disc by bond-casting cast iron and aluminum (Al) and a method of manufacturing a brake disc by using cast iron and then inserting Al foam thereinto. Even when nodular cast iron is used, upper and lower plates of the conventional cast iron disc need to have a thickness of at least 7 mm to prevent thermal deformation.

DETAILED DESCRIPTION OF THE INVENTION

Technical Problem

However, the method of manufacturing a brake disc by bond-casting cast iron and aluminum (Al) merely achieves a weight reduction rate of only about 40%. The method of manufacturing a brake disc by casting cast iron and then inserting metal foam thereinto has a very complex manufacturing process, does not easily achieve uniformity in closed-cell-type metal foam, and is not easily applicable due to a difference in continuous heating.

The present invention provides a brake disc and a brake disc manufacturing method capable of ensuring a weight reduction effect, achieving high heat radiation efficiency and durability, and thus achieving an increase in fuel efficiency and a reduction in braking distance. However, the scope of the present invention is not limited thereto.

Technical Solution

According to an aspect of the present invention, there is provided a brake disc manufacturing method including a porous metal block preparation operation for preparing a porous metal block having a plurality of pores therein, and an insert casting operation for mounting the porous metal block in a mold and casting a disc plate material to manufacture a brake disc.

The porous metal block preparation operation may include an operation for preparing an open-cell-type porous metal block having therein a plurality of pores connected to each other and fillable with a filler.

The brake disc manufacturing method may further include a filler filling operation for filling the filler in the open-cell-type porous metal block prepared in the porous metal block preparation operation, after the porous metal block preparation operation such that cast iron and the disc plate material do not permeate thereinto in the insert casting operation, and a filler removal operation for removing the filler filled in the brake disc manufactured in the insert casting operation, after the insert casting operation.

In the filler filling operation, the filler may include one of sand, plaster, metal powder, magnet powder, resin powder, and molding sand.

The filler removal operation may include an operation for removing the filler filled in the brake disc manufactured in the insert casting operation, by at least one of vibration, sandblasting, and vacuum suction.

The brake disc manufacturing method may further include a bridge hole generation operation for generating bridge holes in the porous metal block, and a hole filler filling operation for temporarily filling a hole filler to be removed before the insert casting operation or to be melted away in the insert casting operation, e.g., sand, expanded polystyrene, or paraffin wax, in the bridge holes, before the filler filling operation, and may further include a hole filler removal operation for removing the hole filler temporarily filled in the bridge holes, and a boundary filler removal operation for removing the filler filled in boundaries between the porous metal block and a casting material by using an air blower such that cast iron and the disc plate material partially permeate into and are firmly fixed to the boundaries in the insert casting operation, after the filler filling operation.

The brake disc manufacturing method may further include a bridge hole generation operation for generating bridge holes in the porous metal block, a hole filler filling operation for temporarily filling a hole filler to be removed before the insert casting operation or to be melted away in the insert casting operation, e.g., sand, expanded polystyrene, or paraffin wax, in the bridge holes, and a boundary filler filling operation for temporarily filling a boundary filler to be melted away in the insert casting operation, e.g., expanded polystyrene or paraffin wax, in boundaries between the porous metal block and a casting material, before the filler filling operation.

According to another aspect of the present invention, there is provided a brake disc including a first disc plate and a second disc plate corresponding to each other and having friction surfaces to generate friction forces in contact with brake pads, and a porous metal block made of porous metal and insert-cast between the first and second disc plates.

The porous metal block may include an open-cell-type porous metal block having therein a plurality of pores connected to each other and fillable with a filler.

The porous metal block may include through holes penetrating from a surface to the other surface of the porous metal block, and the first and second disc plates may include connection parts configured to interconnect the first and second disc plates through the through holes.

When insert-cast, the porous metal block may be partially buried by a casting material at a boundary between the first disc plate and the porous metal block and a boundary between the second disc plate and the porous metal block.

Advantageous Effects

As described above, according to an embodiment of the present invention, since a cast iron brake disc is manufactured by inserting a porous metal block thereinto, a weight reduction effect may be ensured and the thickness of upper and lower plates may be reduced to about 3 mm. Since an open-cell-type porous metal block having a pore size of 20 pores per inch (ppi) (2 mm to 3.5 mm) has a surface area of $1,100 \text{ m}^2/\text{m}^3$ and thus achieves high heat radiation efficiency and durability, an increase in fuel efficiency and a reduction in braking distance may be achieved. In addition, since the open-cell-type porous metal block has an extremely high surface area ratio per unit volume, an ultra light weight, a high strength, a high processability, a high impact resistance, a high noise absorbability, and sound absorption and electromagnetic shielding characteristics, the above-described effects may be achieved when the brake disc is manufactured using the open-cell-type porous metal block. A brake disc and a brake disc manufacturing method having the above effects may be implemented. However, the scope of the present invention is not limited thereto.

BEST MODE

Figure 1:
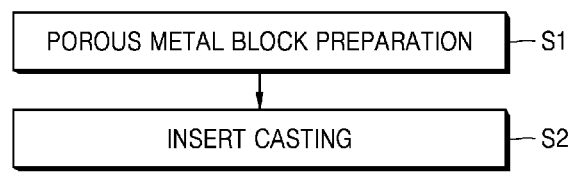
FIG. 1 is a flowchart of a brake disc manufacturing method according to some embodiments of the present invention.

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thickness or sizes of layers may be exaggerated for clarity and convenience of explanation.

Figure 2:
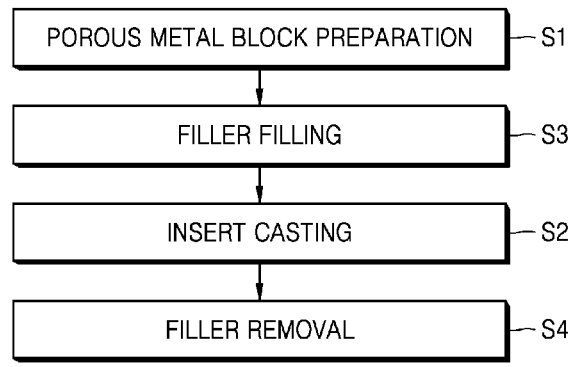
FIG. 2 is a flowchart of a brake disc manufacturing method according to other embodiments of the present invention.
Figure 7:
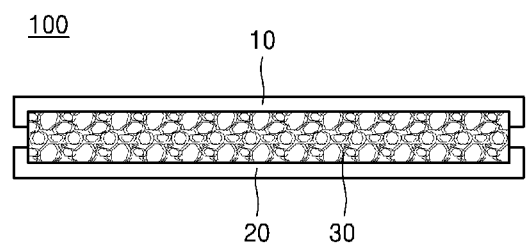
FIG. 7 is a cross-sectional view of a brake disc according to some embodiments of the present invention.

FIG. 1 is a flowchart of a brake disc manufacturing method according to some embodiments of the present invention, FIG. 7 is a cross-sectional view of a brake disc 100 according to some embodiments of the present invention, and FIG. 2 is a flowchart of a brake disc manufacturing method according to other embodiments of the present invention.

As illustrated in FIG. 1, the brake disc manufacturing method according to some embodiments of the present invention may basically include a porous metal block preparation operation S1 and an insert casting operation S2.

Specifically, the brake disc manufacturing method may include the porous metal block preparation operation S1 for preparing a porous metal block having a plurality of pores therein, and the insert casting operation S2 for mounting the porous metal block in a mold and casting a disc plate material to manufacture the brake disc 100.

Figure 3:
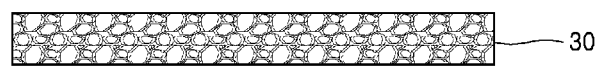
FIG. 3 is a cross-sectional view for describing a porous metal block preparation operation of FIG. 2.
Figure 5:
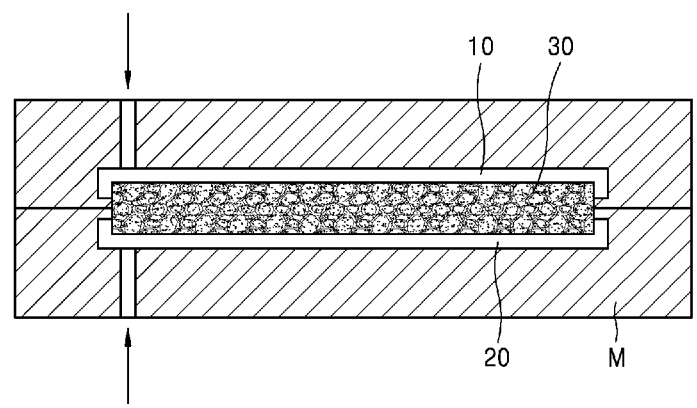
FIG. 5 is a cross-sectional view for describing an insert casting operation of FIG. 2.

FIG. 3 is a cross-sectional view for describing the porous metal block preparation operation S1 of FIGS. 1 and 2, and FIG. 5 is a cross-sectional view for describing the insert casting operation S2 of FIGS. 1 and 2.

Herein, as illustrated in FIGS. 1 to 3, in the porous metal block preparation operation S1, a part of the brake disc 100 in which no friction surfaces are provided may be made of a porous metal block 30 to reduce a weight of the brake disc 100.

Specifically, for example, the porous metal block preparation operation S1 may be an operation for preparing an open-cell-type porous metal block O having therein a plurality of pores connected to each other and fillable with a filler S.

Herein, in the porous metal block preparation operation S1, the porous metal block 30 may be metal foam, and the metal foam may be porous metal having a three-dimensional reticular structure and having a very high porosity. The metal foam may be produced by adding a gas-creating material into molten metal or by filling metal in empty spaces of resin foam and burning up the resin.

Although not shown in FIG. 3, the porous metal block 30 may be made of iron (Fe)-, titanium (Ti)-, magnesium (Mg)-, or aluminum (Al)-based metal, and may include one of bronze, Al foam, stainless steel having a high corrosion resistance or thermal resistance, nickel (Ni), and Ti.

Specifically, for example, the porous metal block 30 may be classified into a closed-cell-type porous metal block O and an open-cell-type porous metal block C. Herein, the closed-cell-type porous metal block C may be made of metal including independent pores not connected to each other, and the open-cell-type porous metal block O may be made of metal including pores connected to each other, may allow a gas or a fluid to easily pass therethrough, and may have the above-described effects.

Herein, the open-cell-type porous metal block O may have a composition the same as that of metal of a first disc plate 10 and a second disc plate 20. In this case, the first and second disc plates 10 and 20 and the open-cell-type porous metal block O may have a composition of Fe (a main component), carbon (C) (3.0 wt % to 3.8 wt %), silicon (Si) (1.0 wt % to 2.8 wt %), manganese (Mn) (equal to or lower than 1.0 wt % (higher than 0 wt %)), phosphorus (P) (equal to or lower than 0.2 wt % (higher than 0 wt %)), sulfur (S) (equal to or lower than 0.15 wt % (higher than 0 wt %)), and unavoidable impurities.

As described, when the first and second disc plates 10 and 20 and the open-cell-type porous metal block O have the same composition, the first and second disc plates 10 and 20 and the open-cell-type porous metal block O may have the same thermal expansion coefficient and thus stability of a bonding structure therebetween may be maintained.

Figure 4:
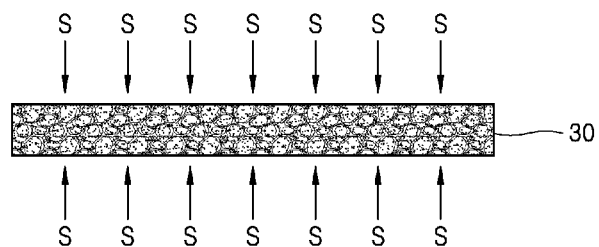
FIG. 4 is a cross-sectional view for describing a filler filling operation of FIG. 2.

As illustrated in FIGS. 2 and 4, the brake disc manufacturing method may further include a filler filling operation S3 for filling the filler S in the open-cell-type porous metal block O prepared in the porous metal block preparation operation S1, after the porous metal block preparation operation S1 such that cast iron and the disc plate material do not permeate thereinto in the insert casting operation S2.

In the insert casting operation S2, the porous metal block 30 prepared in the porous metal block preparation operation S1 may be mounted in a mold and the disc plate material may be cast together with the porous metal block 30.

FIG. 4 is a cross-sectional view for describing the filler filling operation S3 of FIG. 2.

Specifically, for example, the filler filling operation S3 may be an operation for filling the filler S in the open-cell-type porous metal block O. Since the porous metal block 30 is provided as the open-cell-type porous metal block O, the filler S may be filled in the open-cell-type porous metal block O. In the filler filling operation S3, the filler S may include one of sand, plaster, metal powder, magnet powder, resin powder, and molding sand.

Although not shown in FIG. 4, the filler S may be a liquid or solid material capable of being filled in the open-cell-type porous metal block O. In this case, the filler S may include a material which does not spill in the insert casting operation S2 after being injected into the open-cell-type porous metal block O, and is removable in a filler removal operation S4.

The brake disc manufacturing method may further include the filler removal operation S4 for removing the filler S filled in the brake disc 100 manufactured in the insert casting operation S2, after the insert casting operation S2.

Figure 6:
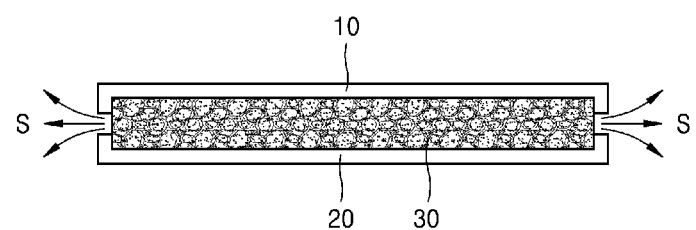
FIG. 6 is a cross-sectional view for describing a filler removal operation of FIG. 2.

FIG. 6 is a cross-sectional view for describing the filler removal operation S4 of FIG. 2.

Specifically, for example, the filler S filled in the filler filling operation S3 may be removed to reduce the weight of the cast brake disc 100. Therefore, the filler S may be removed from the open-cell-type porous metal block O by, for example, vacuum suction.

Although not shown in FIG. 6, the filler S may be removed by using gravity and vibration, by blowing air into the open-cell-type porous metal block O, by injecting a liquid such as water or oil into the open-cell-type porous metal block O, or by using centrifugal force.

Figure 8:
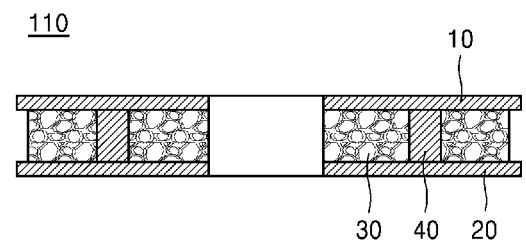
FIG. 8 is a vertical cross-sectional view of a brake disc according to other embodiments of the present invention.
Figure 9:
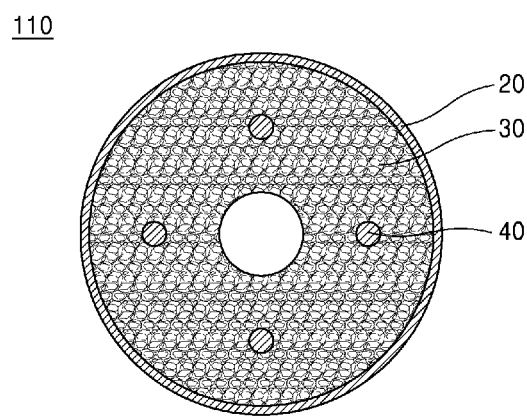
FIG. 9 is a horizontal cross-sectional view of a brake disc according to other embodiments of the present invention brake disc.
Figure 10:
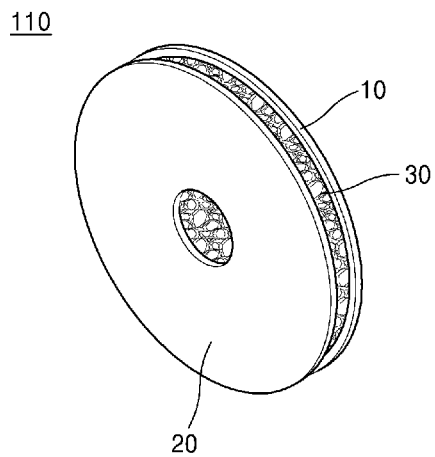
FIG. 10 is a perspective view of a brake disc according to other embodiments of the present invention.

FIG. 10 is a perspective view of a brake disc 110 according to other embodiments of the present invention, FIG. 8 is a vertical cross-sectional view of the brake disc 110 of FIG. 10, and FIG. 9 is a horizontal cross-sectional view of the brake disc 110 of FIG. 10.

Herein, as illustrated in FIG. 10, the brake disc 110 according to other embodiments of the present invention may include the first and second disc plates 10 and 20 corresponding to each other and having friction surfaces 10*a* and 20*a* to generate friction forces in contact with brake pads BP, and the porous metal block 30 made of porous metal and insert-cast between the first and second disc plates 10 and 20.

Herein, the first and second disc plates 10 and 20 may be generated in the insert casting operation S2 and may include the friction surfaces 10*a* and 20*a* squeezed by calipers (not shown).

Herein, although not shown in FIGS. 8 to 10, the friction surfaces 10*a* and 20*a* may include a plurality of holes and linear holes to efficiently increase heat dissipation characteristics.

As illustrated in FIGS. 8 and 9, the porous metal block 30 may include through holes 31 penetrating from a surface to the other surface of the porous metal block 30, and the first and second disc plates 10 and 20 may include connection parts 40 configured to interconnect the first and second disc plates 10 and 20 through the through holes 31.

Specifically, for example, the connection parts 40 may be a sort of bridge structures which are integrally connected to the first and second disc plates 10 and 20 through the through holes 31 of the porous metal block 30 in the insert casting operation S2 to integrate and firmly fix the first and second disc plates 10 and 20 with and to the porous metal block 30.

Although not shown in FIGS. 8 to 10, when the first and second disc plates 10 and 20 are cast by inserting the porous metal block 30 therebetween, in addition to a cylindrical shape, the through holes 31 may be generated in a rectangular shape or a linear shape and thus the connection parts 40 may be generated in a rectangular shape or a linear shape corresponding to the through holes 31.

Although not shown in FIGS. 8 to 10, the brake disc 100 may include a fixing part at a center of the first and second disc plates 10 and 20 to fix the brake disc 100 to a shaft, and the fixing part may have various shapes fixable to a shaft.

Therefore, according to some embodiments of the present invention, since a cast iron brake disc is manufactured by inserting a porous metal block thereinto, a weight reduction effect may be ensured, high heat radiation efficiency and durability may be achieved, and thus an increase in fuel efficiency and a reduction in braking distance may be achieved. In addition, since an open-cell-type porous metal block has an extremely high surface area ratio per unit volume, an ultra light weight, a high strength, a high processability, a high impact resistance, a high noise absorbability, and sound absorption and electromagnetic shielding characteristics, the above-described effects may be achieved when the brake disc is manufactured using the open-cell-type porous metal block.

Figure 11:
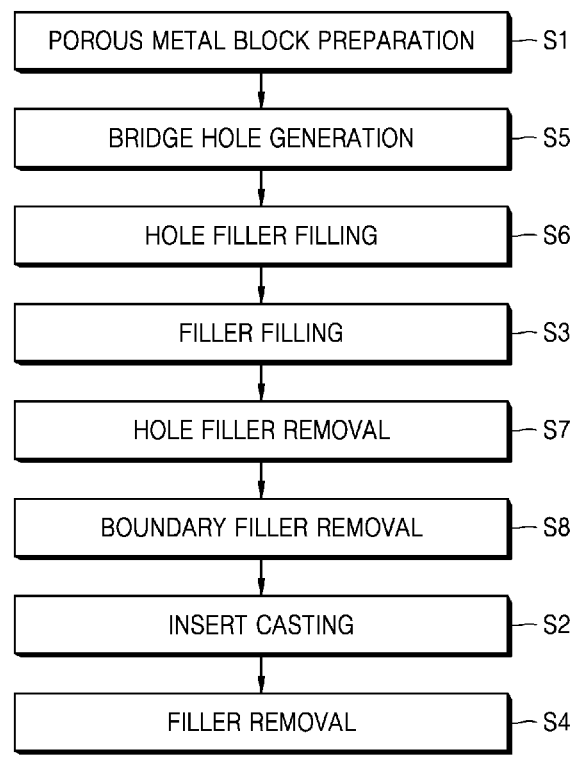
FIG. 11 is a flowchart of a brake disc manufacturing method according to other embodiments of the present invention.

FIG. 11 is a flowchart of a brake disc manufacturing method according to other embodiments of the present invention.

As illustrated in FIG. 11, the brake disc manufacturing method according to other embodiments of the present invention may further include a bridge hole generation operation S5 and a hole filler filling operation S6 before the filler filling operation S3 described above in relation to FIG. 2, and further include a hole filler removal operation S7 and a boundary filler removal operation S8 after the filler filling operation S3.

Figure 12:
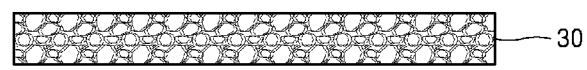
FIGS. 12 to 18 are cross-sectional views for describing sequential operations of the brake disc manufacturing method of FIG. 11.
Figure 13:
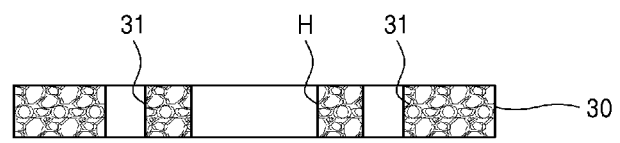
Figure 14:
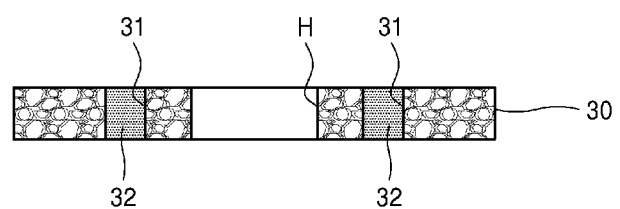
Figure 15:
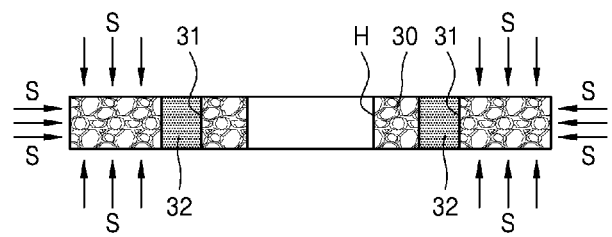
Figure 16:
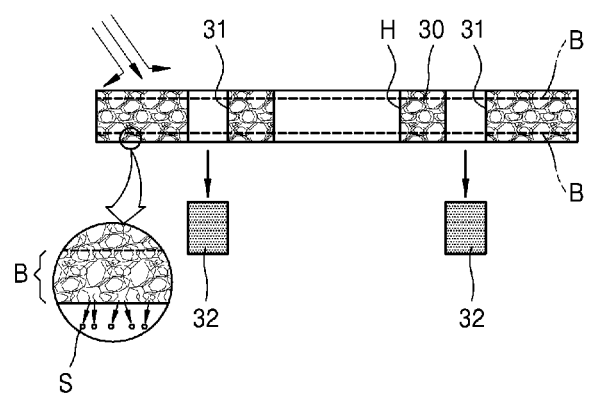
Figure 17:
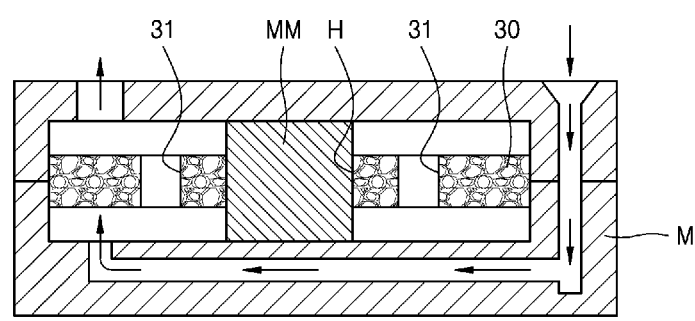
Figure 18:
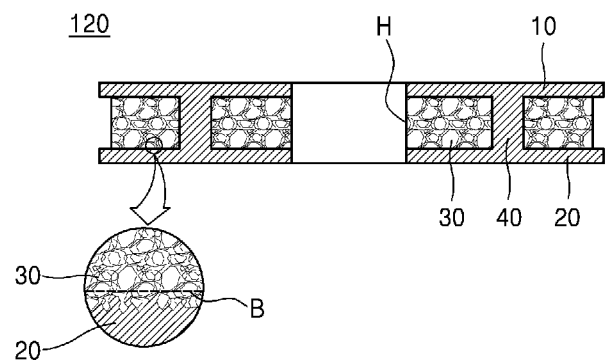

FIG. 12 is a cross-sectional view for describing the porous metal block preparation operation S1 of FIG. 11, FIG. 13 is a cross-sectional view for describing the bridge hole generation operation S5 of FIG. 11, FIG. 14 is a cross-sectional view for describing the hole filler filling operation S6 of FIG. 11, FIG. 15 is a cross-sectional view for describing the filler filling operation S3 of FIG. 11, FIG. 16 is a cross-sectional view for describing the hole filler removal operation S7 and the boundary filler removal operation S8 of FIG. 11, FIG. 17 is a cross-sectional view for describing the insert casting operation S2 of FIG. 11, and FIG. 18 is a cross-sectional view for describing the filler removal operation S4 of FIG. 11.

The brake disc manufacturing method according to other embodiments of the present invention will now be described in detail with reference to FIGS. 12 to 18. As illustrated in FIG. 12, the above-described porous metal block 30 may be prepared and then, as illustrated in FIG. 13, the bridge hole generation operation S5 may be an operation for generating bridge holes 31 in the porous metal block 30. In this case, as illustrated in FIG. 13, a hub hole H may also be generated based on the shape or type of a brake disc.

As illustrated in FIG. 14, the hole filler filling operation S6 may be an operation for temporarily filling a hole filler 32 to be removed before the insert casting operation S2 or to be melted away in the insert casting operation S2, e.g., sand, expanded polystyrene, or paraffin wax, in the bridge holes 31.

As illustrated in FIG. 15, the filler filling operation S3 may be an operation for filling the filler S, e.g., sand, in the porous metal block 30 except for spaces in which the hole filler 32 is filled. In this case, the filler S may be hardened by applying heat or pressure thereto.

As illustrated in FIG. 16, the hole filler removal operation S7 may be an operation for removing the hole filler 32 temporarily filled in the bridge holes 31, and the boundary filler removal operation S8 may be an operation for removing the filler S filled in boundaries B between the porous metal block 30 and a casting material by using an air blower such that cast iron and the disc plate material partially permeate into and are firmly fixed to the boundaries B in the insert casting operation S2.

As illustrated in FIG. 17, the insert casting operation S2 may be an operation for performing insert casting by inserting the porous metal block 30 into a mold M.

In this case, a core MM corresponding to the hub hole H of the porous metal block 30 may be mounted in the mold M and a brake disc having the hub hole H may be manufactured. Alternatively, for a hub-integrated brake disc, a hub cavity may be generated in the mold M.

As illustrated in FIG. 18, the filler removal operation S4 may be an operation for removing the filler S filled in the porous metal block 30 to reduce a weight of the cast brake disc. Thus, the filler S may be removed from the open-cell-type porous metal block O by, for example, vacuum suction.

FIG. 18 is a cross-sectional view of a brake disc 120 according to other embodiments of the present invention.

Therefore, as illustrated in FIG. 18, in the insert casting operation S2, the casting material may permeate into the boundaries B from which the filler S is partially removed using an air blower and thus the first and second disc plates 10 and 20 and the connection parts 40 may be generated. At the same time, the porous metal block 30 may be partially buried by and structurally firmly bonded to the casting material at the boundary B between the first disc plate 10 and the porous metal block 30 and the boundary B between the second disc plate 20 and the porous metal block 30.

Figure 19:
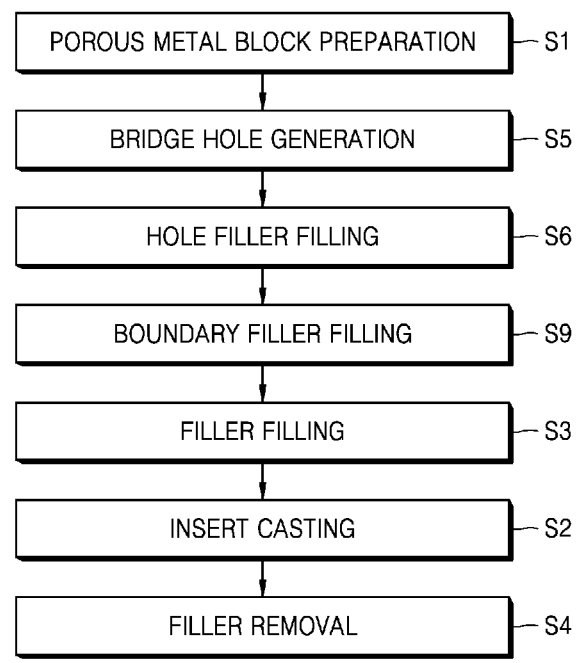
FIG. 19 is a flowchart of a brake disc manufacturing method according to other embodiments of the present invention.

FIG. 19 is a flowchart of a brake disc manufacturing method according to other embodiments of the present invention.

As illustrated in FIG. 19, the brake disc manufacturing method according to other embodiments of the present invention may further include the bridge hole generation operation S5, the hole filler filling operation S6, and a boundary filler filling operation S9 before the filler filling operation S3 described above in relation to FIG. 2.

Figure 20:
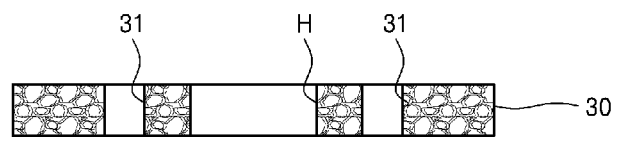
FIGS. 20 to 23 are cross-sectional views for describing sequential operations of the brake disc manufacturing method of FIG. 19.
Figure 21:
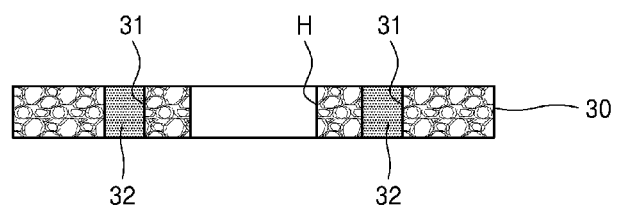
Figure 22:
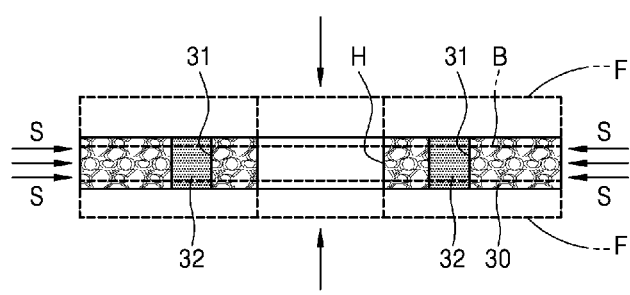
Figure 23:
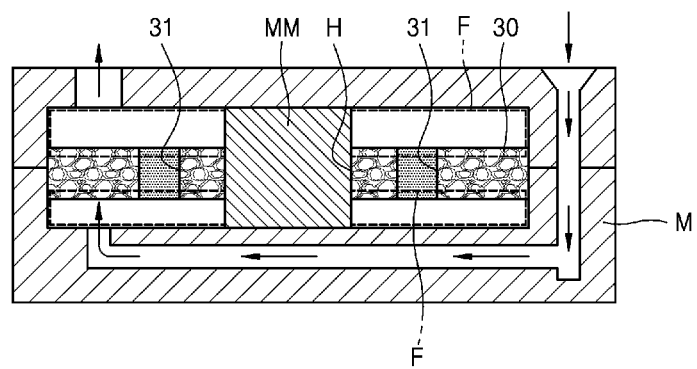

FIG. 20 is a cross-sectional view for describing the bridge hole generation operation S5 of FIG. 19, FIG. 21 is a cross-sectional view for describing the hole filler filling operation S6 of FIG. 19, FIG. 22 is a cross-sectional view for describing the boundary filler filling operation S9 and the filler filling operation S3 of FIG. 19, and FIG. 23 is a cross-sectional view for describing the insert casting operation S2 of FIG. 19.

The brake disc manufacturing method according to other embodiments of the present invention will now be described in detail with reference to FIGS. 20 to 23. As illustrated in FIG. 20, the bridge hole generation operation S5 may be an operation for generating the bridge holes 31 in the porous metal block 30. In this case, as illustrated in FIG. 20, the hub hole H may also be generated based on the shape or type of a brake disc.

As illustrated in FIG. 21, the hole filler filling operation S6 may be an operation for temporarily filling the hole filler 32 to be removed before insert casting or to be melted away in the insert casting operation S2, e.g., sand, expanded polystyrene, or paraffin wax, in the bridge holes 31.

As illustrated in FIG. 22, the boundary filler filling operation S9 may be an operation for temporarily filling a boundary filler F to be melted away in the insert casting operation S2, e.g., expanded polystyrene or paraffin wax, in the boundaries B between the porous metal block 30 and the casting material. The filler filling operation S3 may be an operation for filling the filler S, e.g., sand, in the porous metal block 30 except for spaces in which the hole filler 32 and the boundary filler F are filled. In this case, the filler S may be hardened by applying heat or pressure thereto.

As illustrated in FIG. 23, the insert casting operation S2 may be an operation for performing insert casting by inserting the porous metal block 30 into the mold M.

In this case, the core MM corresponding to the hub hole H of the porous metal block 30 may be mounted in the mold M and a brake disc having the hub hole H may be manufactured. Alternatively, for a hub-integrated brake disc, a hub cavity may be generated in the mold M.

Therefore, as illustrated in FIG. 23, in the insert casting operation S2, the hole filler 32 and the boundary filler F may be removed by high temperature, the casting material may permeate into the spaces from which the hole filler 32 and the boundary filler F are removed, and thus the first and second disc plates 10 and 20 and the connection parts 40 may be generated. At the same time, the porous metal block 30 may be partially buried by and structurally firmly bonded to the casting material at the boundary B between the first disc plate 10 and the porous metal block 30 and the boundary B between the second disc plate 20 and the porous metal block 30.

While the present invention has been particularly shown and described with reference to embodiments thereof, it will be understood by one of ordinary skill in the art that various changes in form and details may be made therein without departing from the scope of the present invention as defined by the following claims.

INDUSTRIAL APPLICABILITY

As described above, according to an embodiment of the present invention, since a cast iron brake disc is manufactured by inserting a porous metal block thereinto, a weight reduction effect may be ensured and a manufacturing cost may be reduced by reducing the thickness of upper and lower plates to about 3 mm. Since an open-cell-type porous metal block having a pore size of 20 pores per inch (ppi) (2 mm to 3.5 mm) has a surface area of 1,100 $m^2/m^3$ and thus achieves high heat radiation efficiency and durability, additional use of materials may be reduced and thus a manufacturing cost may lowered.

The invention claimed is:

1. A brake disc manufacturing method, the method comprising:
a porous metal block preparation operation for preparing a porous metal block having a plurality of pores therein; and
an insert casting operation for mounting the porous metal block in a mold and casting a disc plate material to manufacture a brake disc,
wherein the porous metal block preparation operation comprises an operation for preparing an open-cell-type porous metal block having therein a plurality of pores connected to each other and fillable with a filler,
wherein the method further comprises:
a filler filling operation for filling the filler in the open-cell-type porous metal block prepared in the porous metal block preparation operation, after the porous metal block preparation operation such that cast iron and the disc plate material do not permeate thereinto in the insert casting operation; and
a filler removal operation for removing the filler filled in the brake disc manufactured in the insert casting operation,
after the insert casting operation.

2. The brake disc manufacturing method of claim 1, wherein, in the filler filling operation, the filler comprises one of sand, plaster, metal powder, magnet powder, resin powder, and molding sand.

3. The brake disc manufacturing method of claim 1, wherein the filler removal operation comprises an operation for removing the filler filled in the brake disc manufactured in the insert casting operation, by at least one of vibration, sandblasting, and vacuum suction.

4. The brake disc manufacturing method of claim 1, further comprising:
a bridge hole generation operation for generating bridge holes in the porous metal block; and
a hole filler filling operation for temporarily filling a hole filler to be removed before the insert casting operation or to be melted away in the insert casting operation, sand, expanded polystyrene, or paraffin wax, in the bridge holes,
before the filler filling operation,
and further comprising:
a hole filler removal operation for removing the hole filler temporarily filled in the bridge holes; and
a boundary filler removal operation for removing the filler filled in boundaries between the porous metal block and a casting material by using an air blower such that cast iron and the disc plate material partially permeate into and are firmly fixed to the boundaries in the insert casting operation,
after the filler filling operation.

5. The brake disc manufacturing method of claim 1, further comprising:
a bridge hole generation operation for generating bridge holes in the porous metal block;
a hole filler filling operation for temporarily filling a hole filler to be removed before the insert casting operation or to be melted away in the insert casting operation, e.g., sand, expanded polystyrene, or paraffin wax, in the bridge holes; and
a boundary filler filling operation for temporarily filling a boundary filler to be melted away in the insert casting operation, e.g., expanded polystyrene or paraffin wax, in boundaries between the porous metal block and a casting material,
before the filler filling operation.

* * * * *